Dec. 27, 1960     S. G. ISSERSTEDT     2,966,303
CALCULATOR

Filed Sept. 3, 1953                         13 Sheets-Sheet 1

*INVENTOR.*
S. G. ISSERSTEDT

BY *George V. Eltgroth*
     *Jh. L. Sterling*
                    ATTORNEY

Dec. 27, 1960   S. G. ISSERSTEDT   2,966,303
CALCULATOR
Filed Sept. 3, 1953
13 Sheets-Sheet 2

INVENTOR.
S.G. ISSERSTEDT
BY George V. Eltgroth
J.L. Sterling
ATTORNEY

Dec. 27, 1960   S. G. ISSERSTEDT   2,966,303
CALCULATOR
Filed Sept. 3, 1953   13 Sheets-Sheet 3

INVENTOR.
S. G. ISSERSTEDT
BY
George V. Eltgroth
J. L. Sterling
ATTORNEY

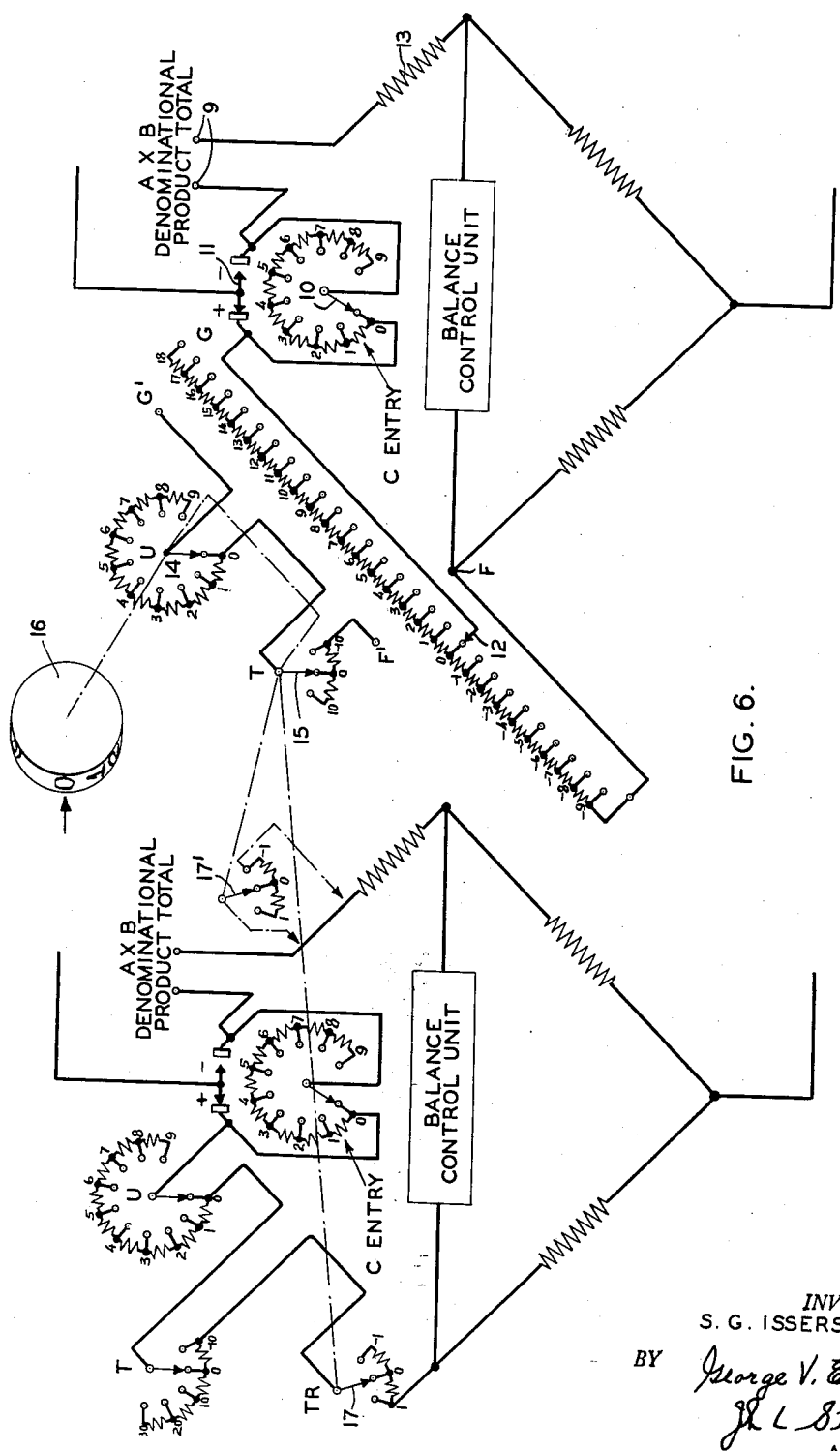

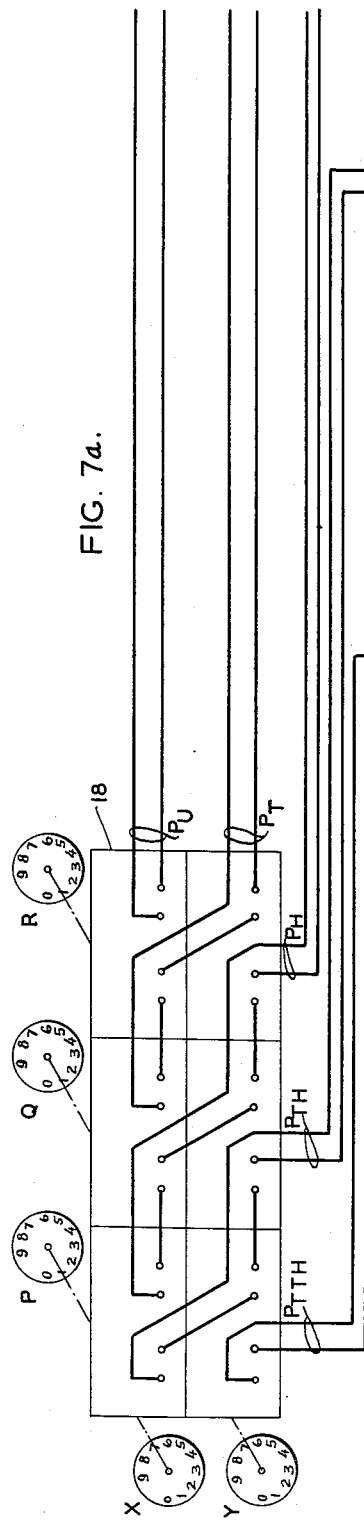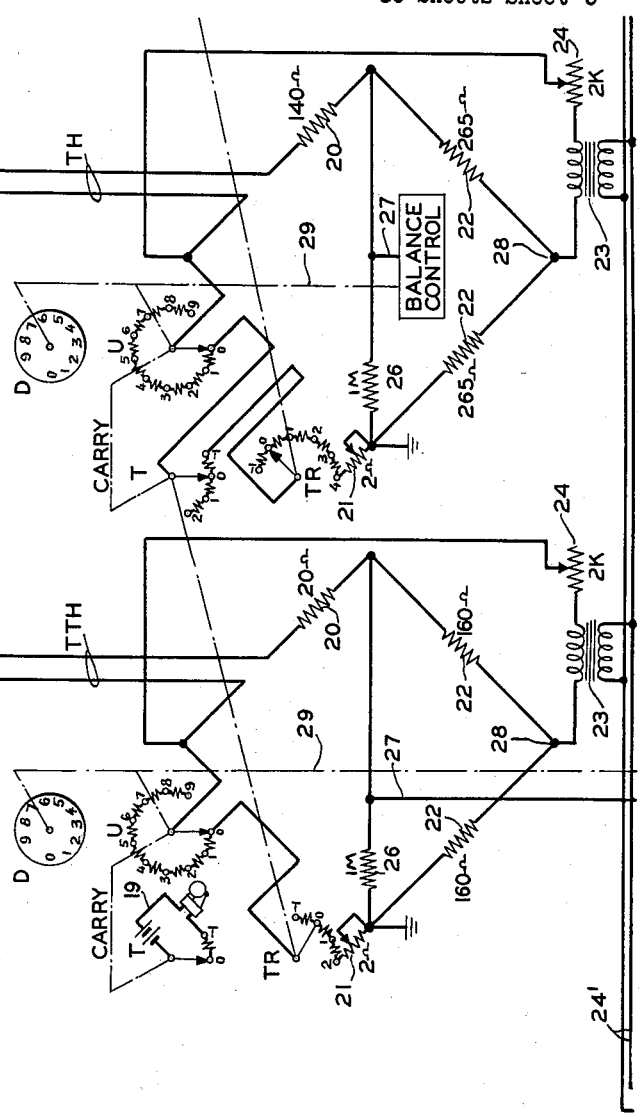

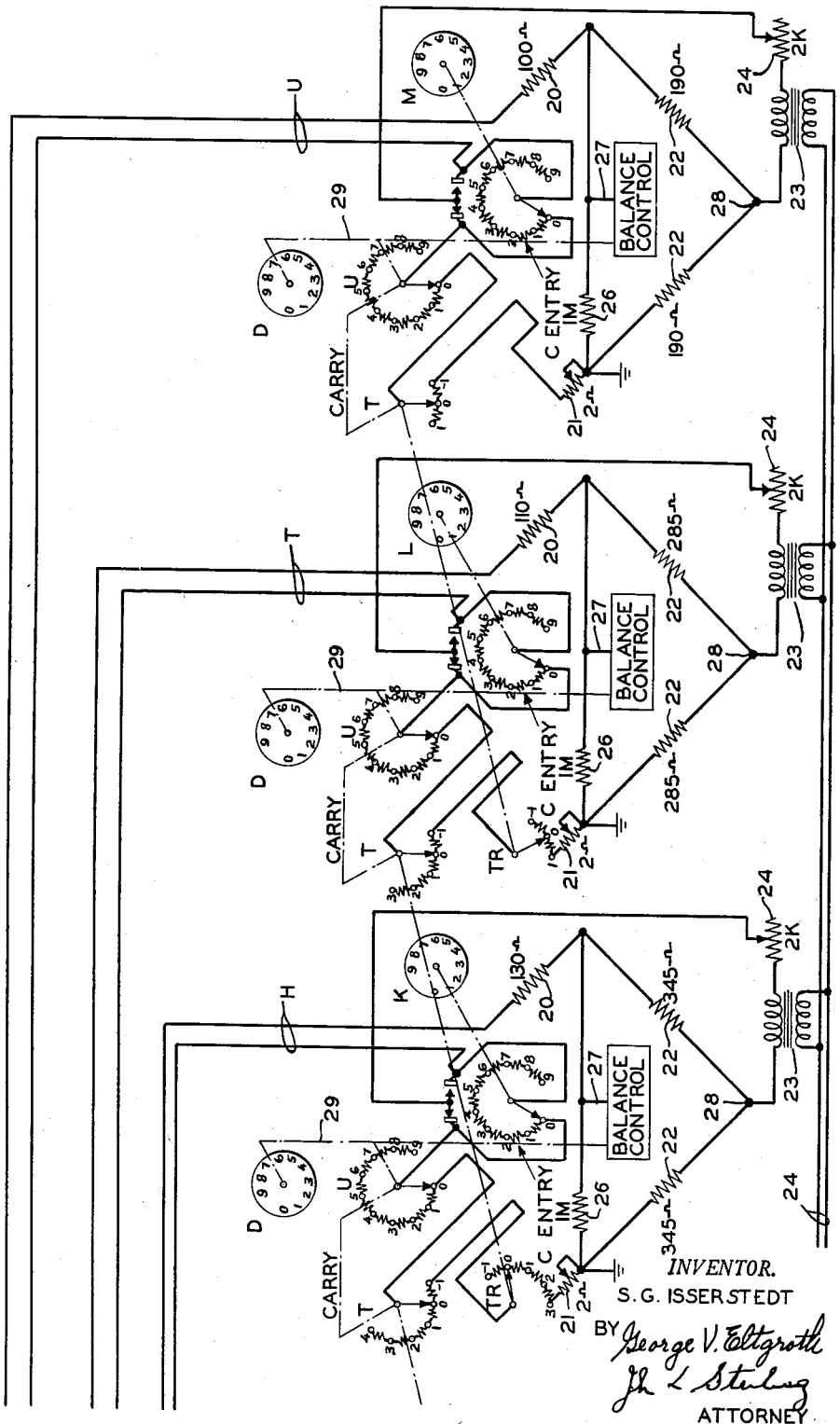

Dec. 27, 1960 S. G. ISSERSTEDT 2,966,303
CALCULATOR
Filed Sept. 3, 1953 13 Sheets-Sheet 7
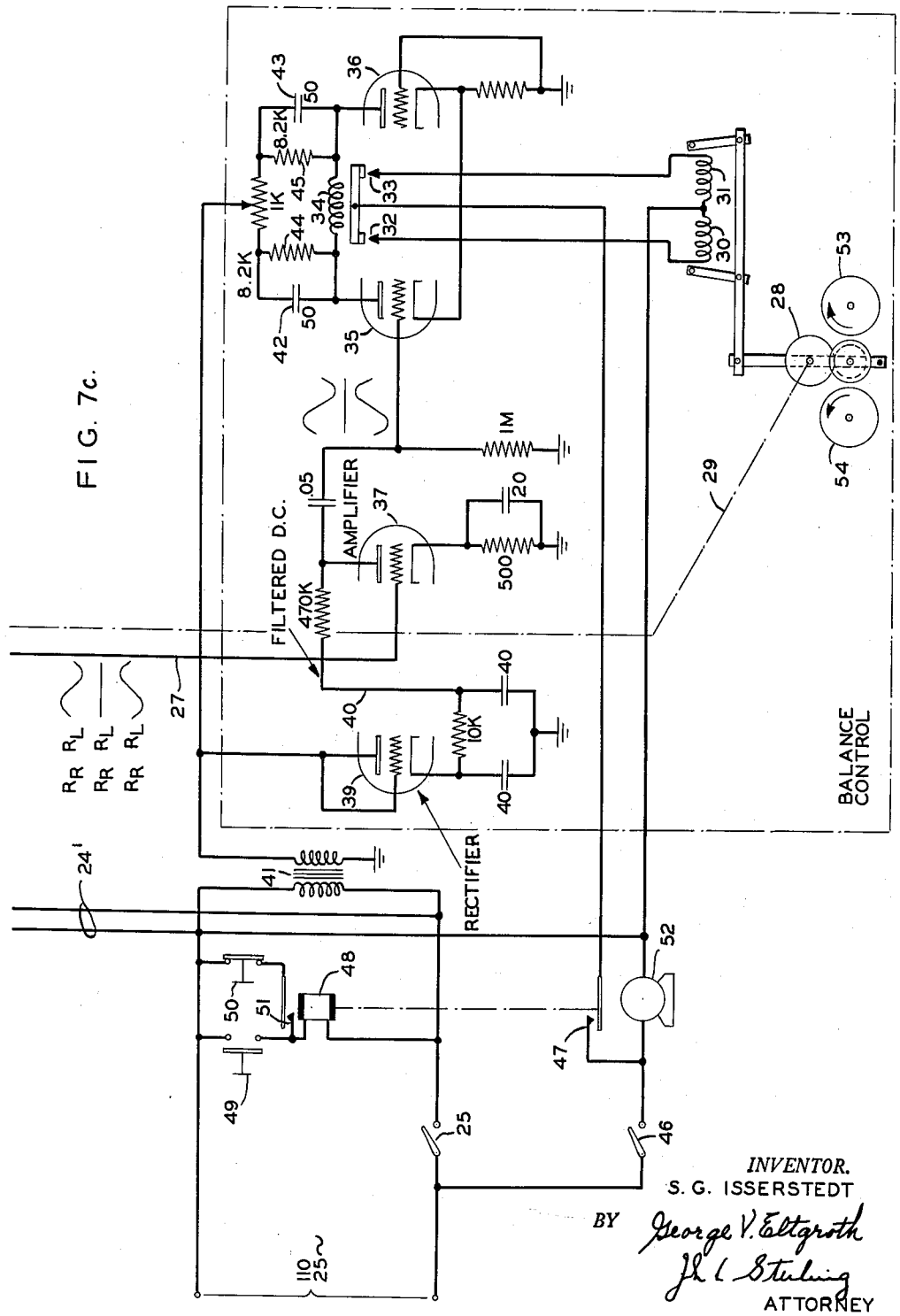
INVENTOR.
S. G. ISSERSTEDT
BY George V. Eltgroth
J. L. Sterling
ATTORNEY

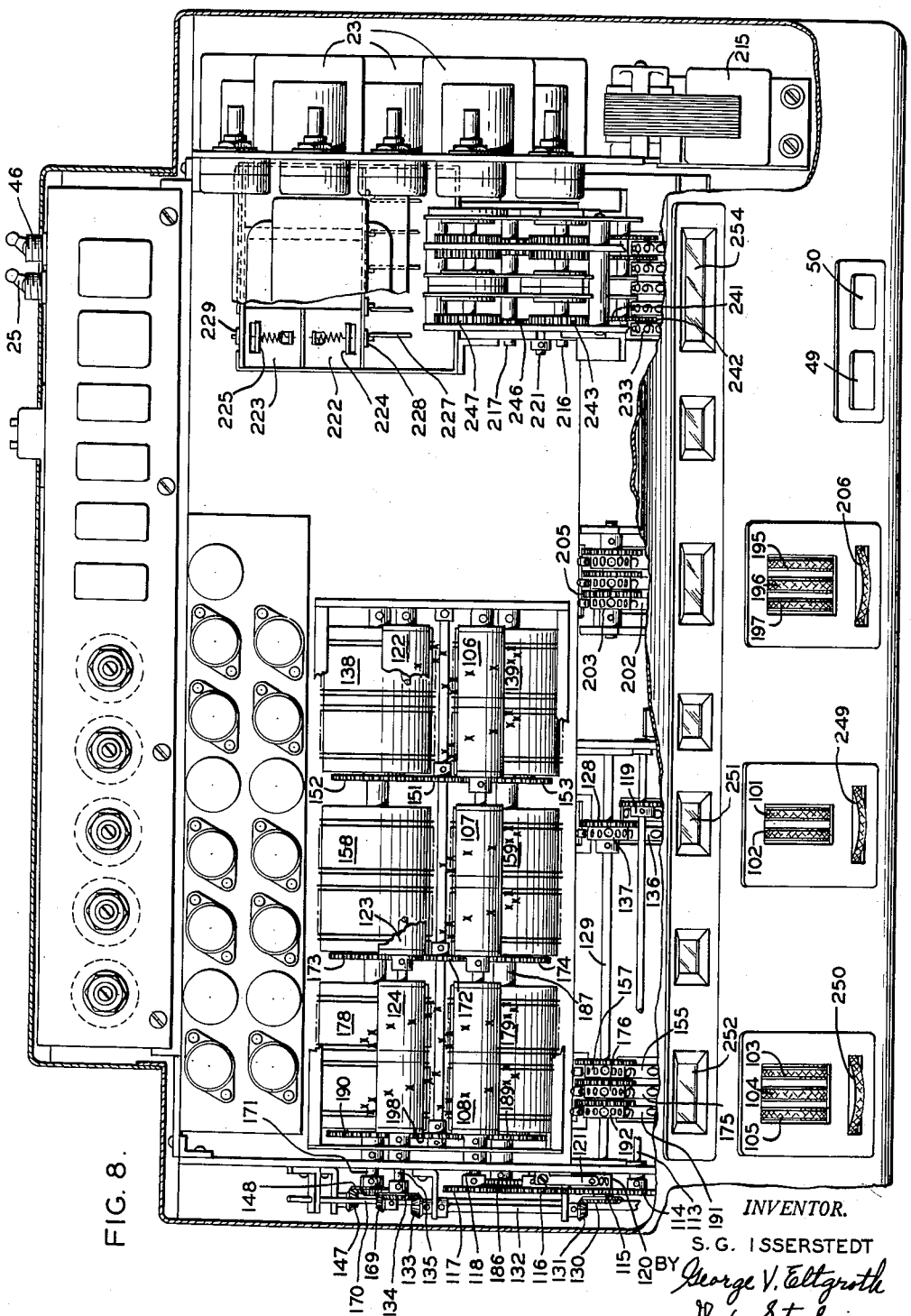

Dec. 27, 1960

S. G. ISSERSTEDT 2,966,303

CALCULATOR

Filed Sept. 3, 1953

INVENTOR.
S. G. ISSERSTEDT

BY *George V. Eltgroth*
*J. L. Sterling*
ATTORNEY

Dec. 27, 1960

S. G. ISSERSTEDT 2,966,303

CALCULATOR

Filed Sept. 3, 1953

INVENTOR.
S.G. ISSERSTEDT
BY George V. Eltgroth
ATTORNEY

Dec. 27, 1960  S. G. ISSERSTEDT  2,966,303
CALCULATOR
Filed Sept. 3, 1953
13 Sheets-Sheet 11
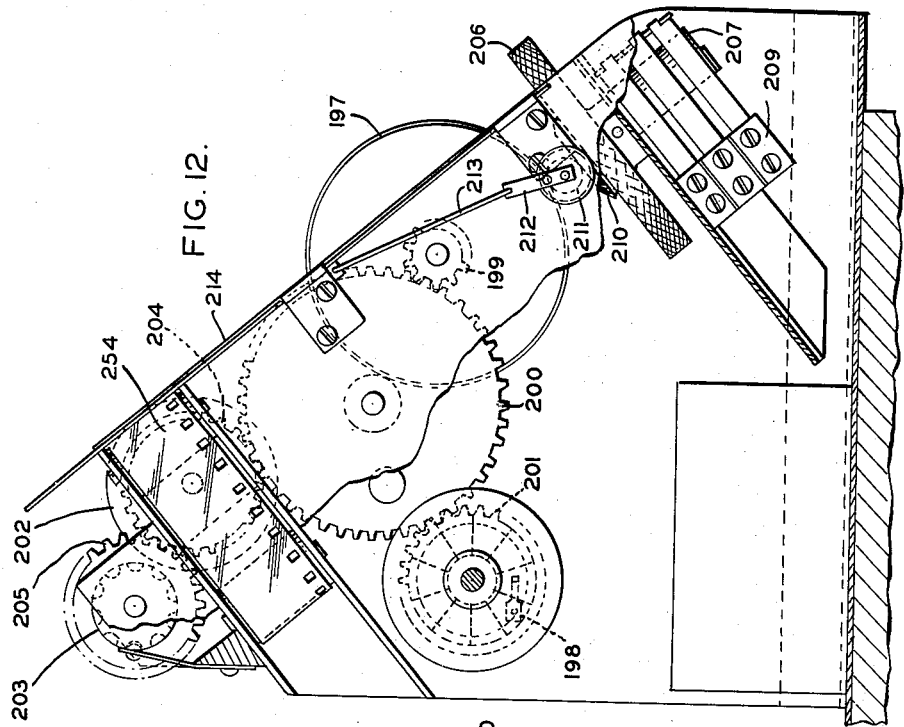
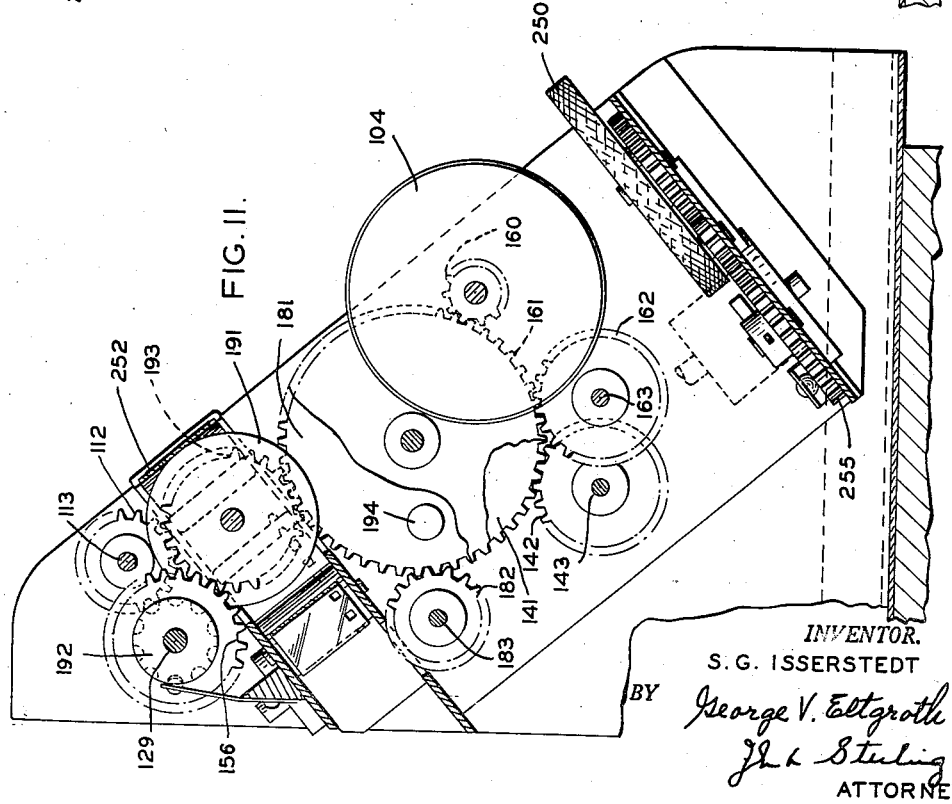
INVENTOR.
S. G. ISSERSTEDT
BY George V. Eltgroth
ATTORNEY Dec. 27, 1960 S. G. ISSERSTEDT 2,966,303
CALCULATOR
Filed Sept. 3, 1953 13 Sheets-Sheet 12

INVENTOR.
S. G. ISSERSTEDT
BY
George V. Eltgroth
J. L. Sterling
ATTORNEY

Dec. 27, 1960 S. G. ISSERSTEDT 2,966,303
CALCULATOR
Filed Sept. 3, 1953 13 Sheets-Sheet 13
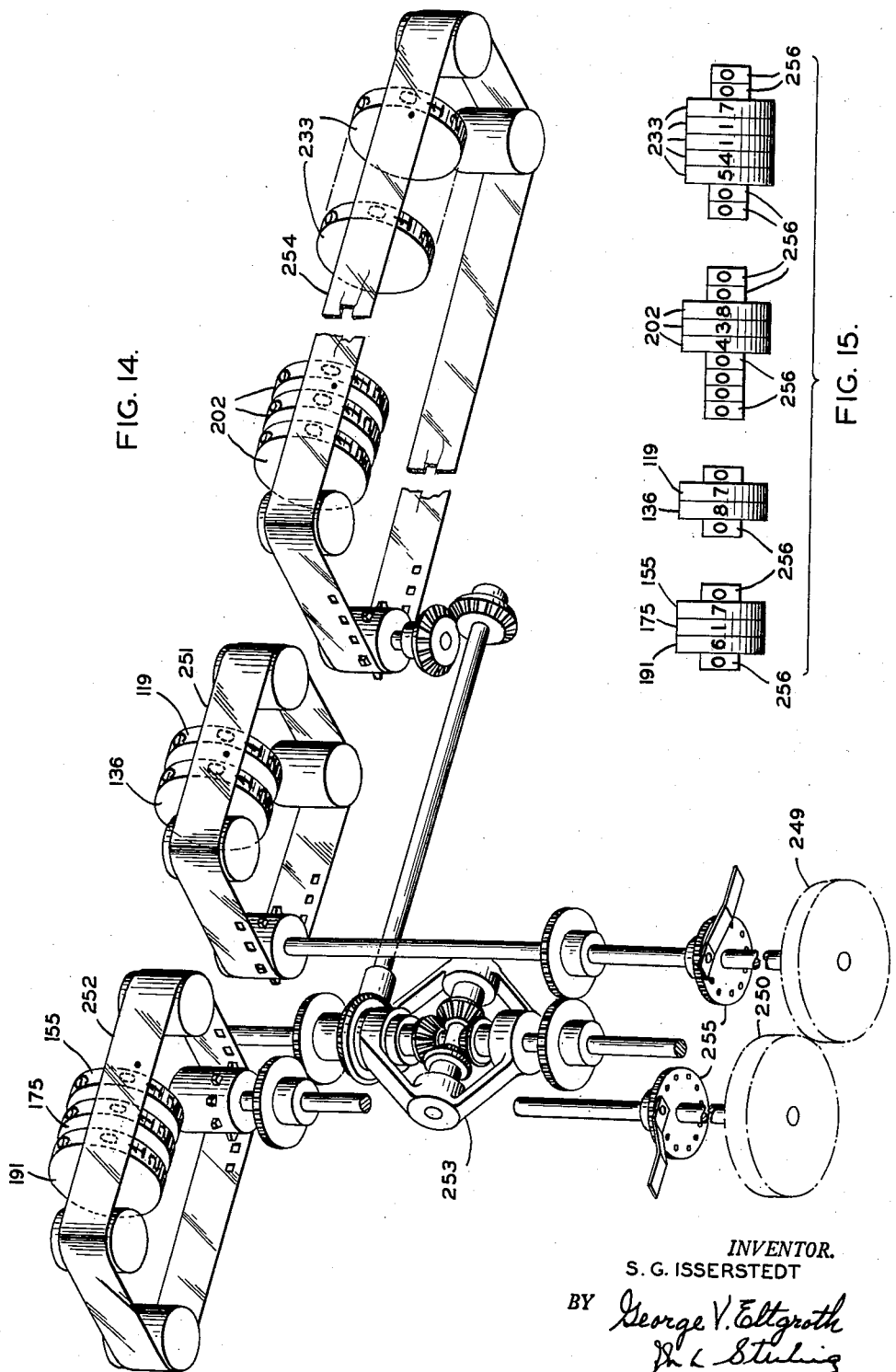
INVENTOR.
S. G. ISSERSTEDT
BY George V. Eltgroth
ATTORNEY

United States Patent Office 2,966,303
Patented Dec. 27, 1960

2,966,303

CALCULATOR

Siegfried Gordon Isserstedt, Toronto, Ontario, Canada, assignor to Gordis, Limited, Toronto, Ontario, Canada, a corporation of Canada Filed Sept. 3, 1953, Ser. No. 378,190

13 Claims. (Cl. 235—160)

The present invention relates to calculating apparatus and more particularly to apparatus for producing digital solutions of equations by means of quantized physical analogues.

The art of digital computation has produced a wide variety of calculating devices ranging from small desk calculators to large electronic data processing systems. A parallel development in the art of analogue computation has produced many useful aids to analysis and control such as the differential analyzer and the automatic gun director.

A comparison between the two types of devices indicates that digital devices generally lack the simplicity of comparable analogue devices and also lack the ability of analogue devices to continuously manifest a function of varying inputs. On the other hand, practical limitations in the construction of analogue devices generally preclude digital outputs of useful accuracy. The present invention employs quantized physical analogues to produce digital output in such a way as to overcome the foregoing disadvantages of both digital and analogue devices. That is to say, devices embodying the present invention may be simply constructed and will continuously manifest digital functions of input factors as the factors are varied.

Objects of the invention are:

To provide a novel device for producing digital solutions of equations by means of quantized physical analogues.

To provide novel means for continuously manifesting digital solutions of equations as input factors are varied.

To provide novel means for producing quantized physical analogues proportional to a function of two variables.

To provide novel means for producing physical analogues of denominational totals contributing to the digital solution of equations.

To provide novel means for manifesting the value of quantized physical analogues.

To provide novel means for converting a quantized denominational analogue to a manifest denominational result digit and a carry digit.

To provide novel means for selectively manifesting the sum or difference of quantized physical analogues.

To provide novel means for manifesting the location of a result decimal point as a function of the location of decimal points in input factors.

To provide novel means responsive to unbalance in an electrical impedance bridge.

To provide novel means for selectively increasing or decreasing a balancing impedance in an impedance bridge.

To provide a novel clutch arrangement for selectively producing quantized displacement in one direction or another.

Other objects of the invention will be apparent from the following description and the accompanying drawings.

In the drawings:

Fig. 6 is a diagram useful in explaining the arrangement of resistance analogues in the impedance bridges.

Figs. 7a to 7c taken together in the manner of Fig. 7d are a schematic wiring diagram for the illustrative apparatus.

Fig. 8 is a top view of the apparatus showing its mechanical arrangement.

Figure 9:
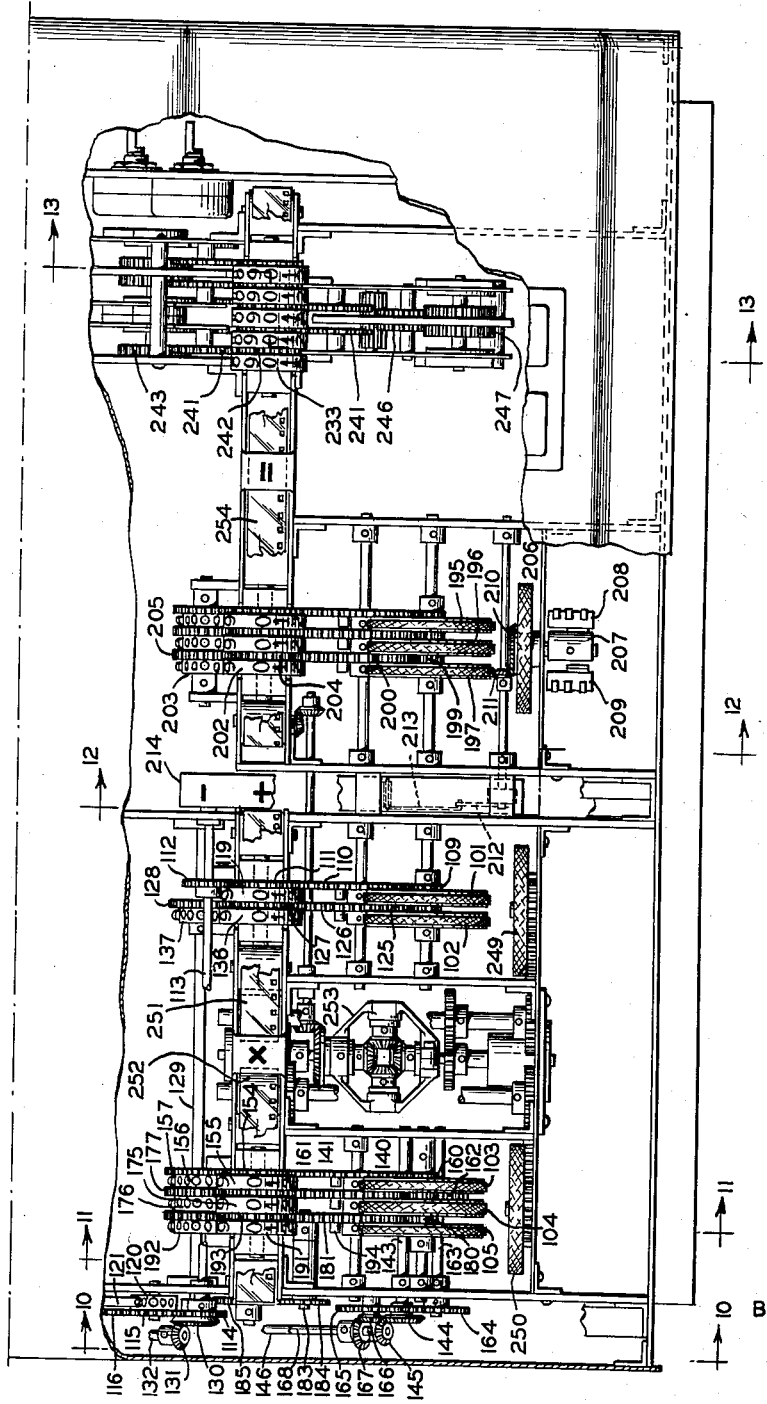

Fig. 9 is a front view of the apparatus taken perpendicular to the inclined front cover.

Figure 10:
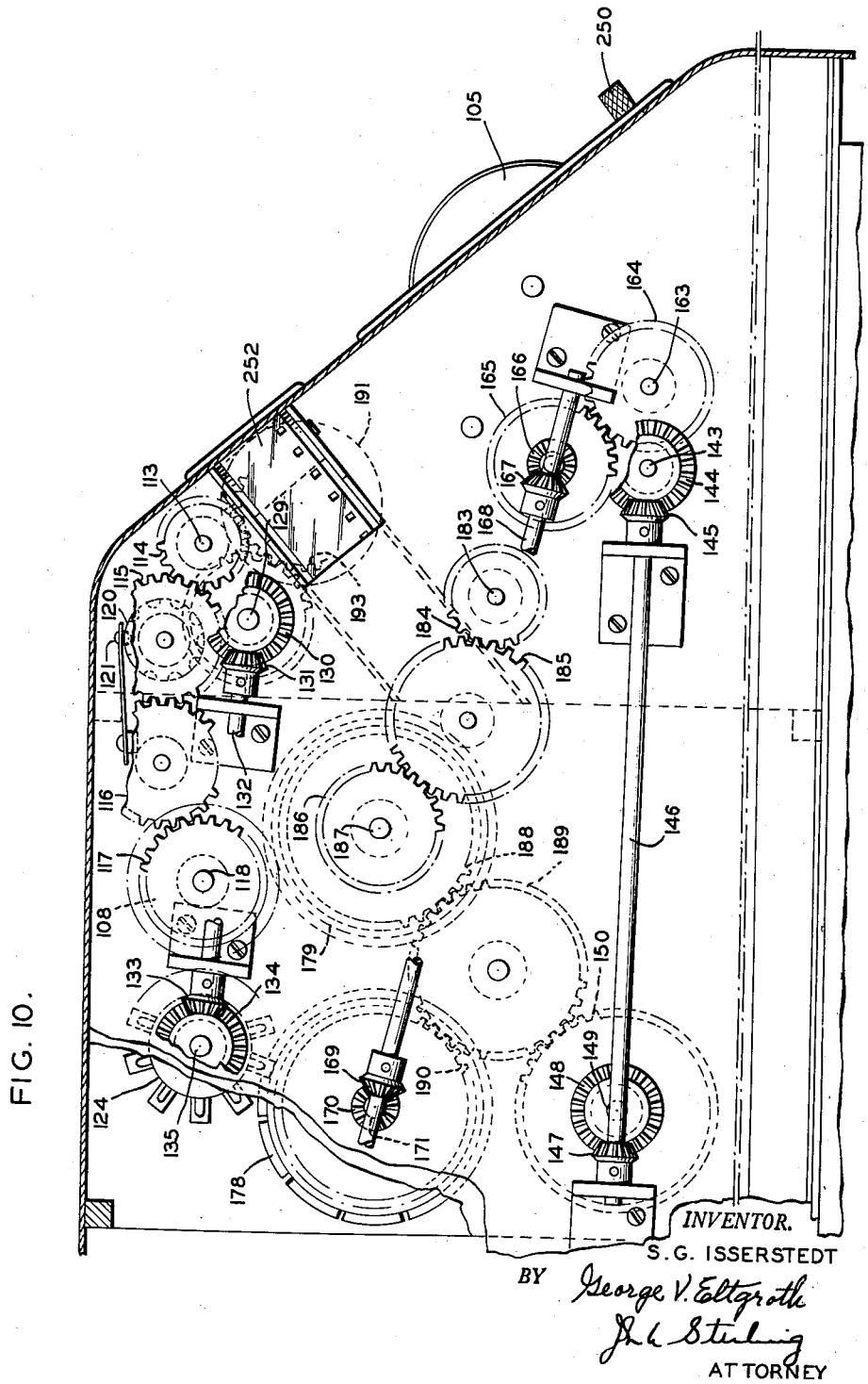

Fig. 10 is an end view of the apparatus showing the gearing between input shafts and function table drums.

Fig. 11 is a sectional view through the entry means associated with the input factors A and B.

Fig. 12 is a sectional view through the entry means associated with the term C.

Figure 13:
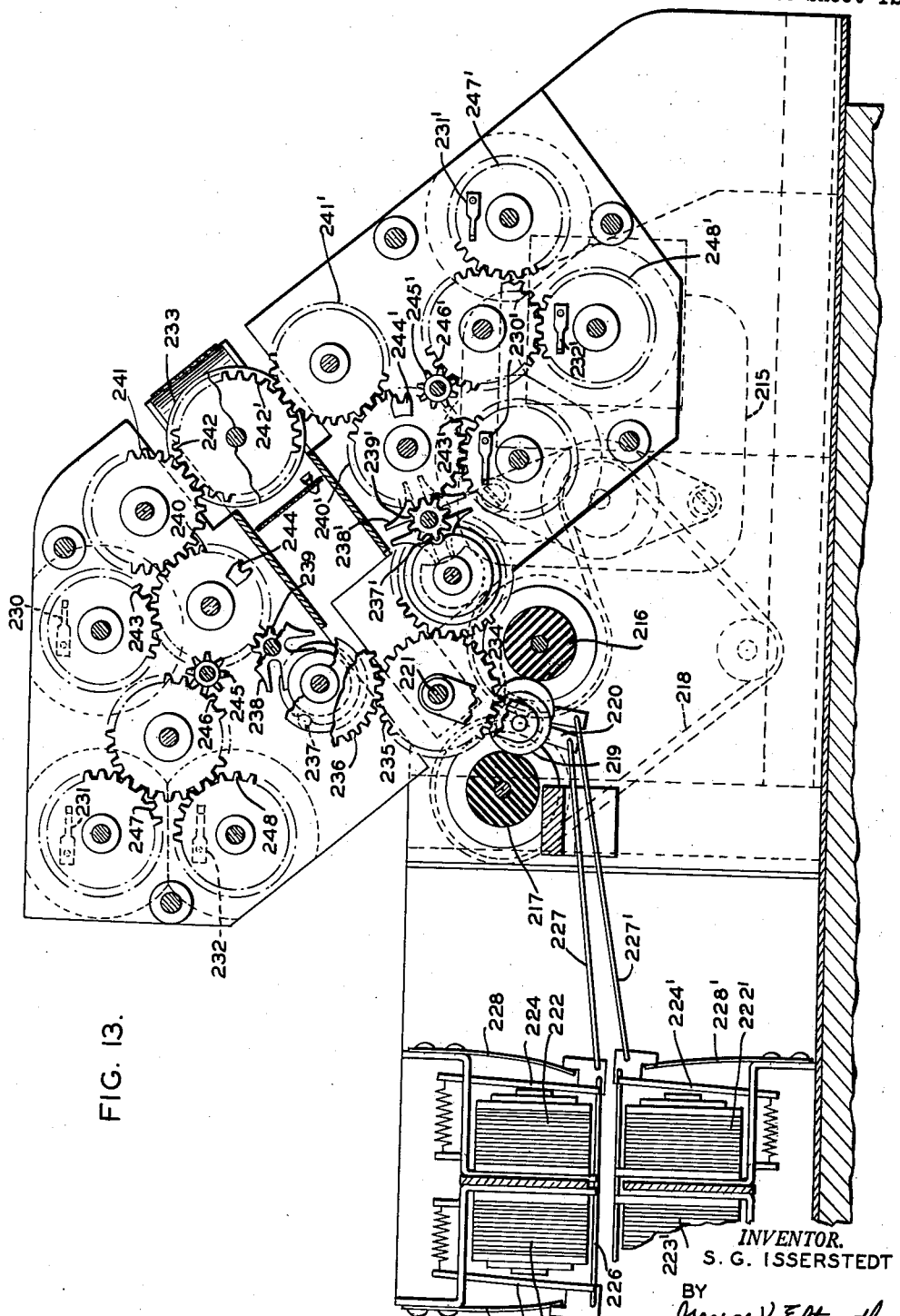

Fig. 13 is a sectional view through the balancing, carry and result display means.

Fig. 14 shows the means by which decimal point location is established and displayed.

Fig. 15 shows how fixed zero displays may be used to increase the range of absolute magnitudes that can be accommodated.

The description and explanation of the invention are arranged in the following sections:

General Description of Illustrative Apparatus
General Mode of Operation
Arithmetic of the Solution
Establishing Partial Product Analogues
Addition or Subtraction of the Term C
Summary of Means for Establishing and Measuring Denominational Analogues
Inter-Denominational Transfer and Result Display
Balancing Circuits
Mechanical Arrangement of Illustrative Apparatus
Decimal Point Location
Other Embodiments of the Invention

*General description of illustrative apparatus*

Figure 1:
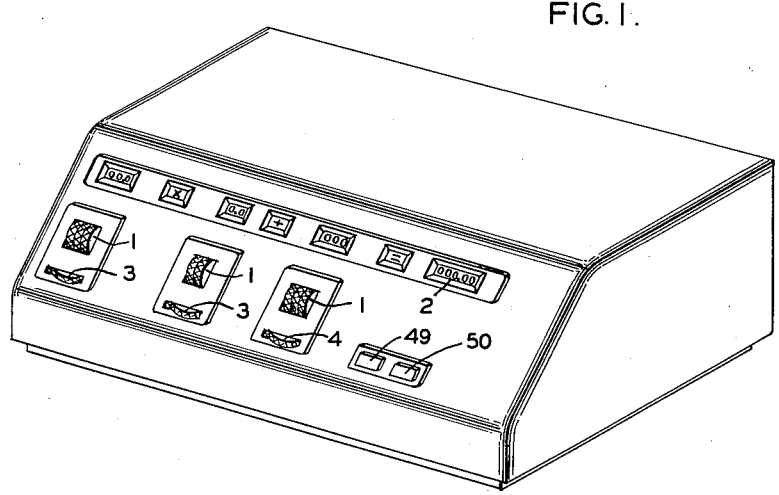
Fig. 1 is a general view of the illustrative embodiment.

The embodiment described herein to illustrate the invention is a calculator for producing the decimal, digital solution of the equation A times B plus or minus C equals X. A general view of the device is shown in Fig. 1. The digital values of the variables A, B, and C are introduced manually by means of input wheels 1 associated with each digit of the variables. The result X is displayed on number wheels 2 associated with each digit of the result. The internal calculating arrangement is such that as the input wheels are turned to enter input data, the result wheels operate responsively to display the correct digital result for each position of the input wheels. Thus the effect of changes in any variable may be continuously reflected in the result display in the same manner as in analogue computing devices, except that here both input and output are represented digitally as quantized magnitudes.

Decimal point locations within the A and B factors are independently entered by manually operated wheels 3 and the resultant locations of decimal points in the result and in the C factor are responsively established and displayed.

Another manual control 4 governs whether the C factor is added to or subtracted from the product of the A and B factors.

General mode of operation

The general method employed to produce digital solutions in the apparatus is that of establishing for each denominational order of the result a quantized physical magnitude proportional to each digit contributing to the total in that denominational order. The magnitudes thus established for a given denominational order are combined additively or subtractively according to the arithmetic of the particular solution desired and their combined value is used to control means for manifesting a denominational result digit and also to control means for carrying to or borrowing from the next higher denominational order.

Summarizing the essential elements in the foregoing method, they are:

(1) Means for establishing quantized physical analogues for each contributing digit in each denominational order.

(2) Means for combining the analogues within a denominational order in accordance with the arithmetic of the desired solution.

(3) Means responsive to the combined analogues in each denomination for manifesting a result digit and for carrying to or borrowing from next higher orders as required.

In the present embodiment of the invention the physical analogues that are established are quantized electrical resistances. Entry of the input factors through switching means establishes a resistance analogue of each digit contributing to each denominational total. These resistance analogues are appropriately combined for each denominational order by means of interconnections between resistances. The combined resistance analogues thus established for each order are connected in associated self-balancing impedance bridges which, as a result of their balancing action, control result display and effect transfer (carry or borrow) between orders.

Arithmetic of the solution

Figure 2:
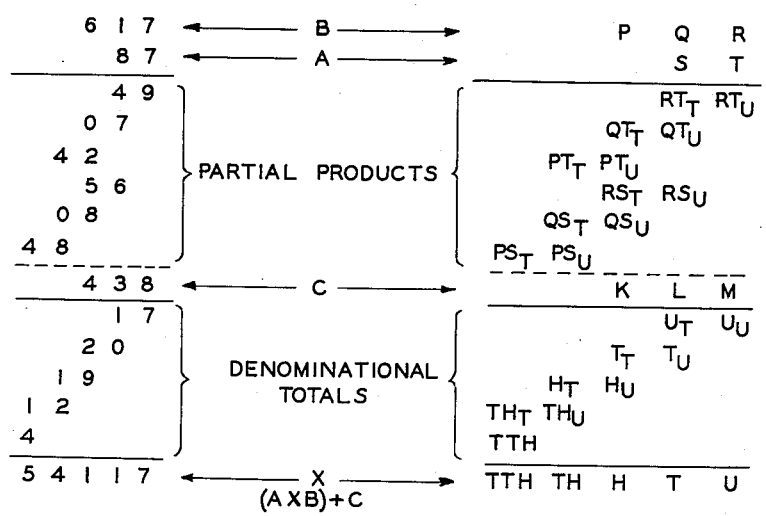
Fig. 2 is a table useful in explaining the relation between result digits and the digits of input factors.

Before proceeding to a description of the various elements of the apparatus, it is well to consider first the arithmetic of the equation $(A \times B) \pm C = X$ that the illustrative apparatus is designed to solve. The numbers contributing to each denominational order of the result, X, and their relation to the input factors A, B, and C are best described by reference to a generalized solution of the equation. The capacity of the illustrative embodiment is such that the factor A, which is the multiplier, can have two decimal digits, the factor B, which is the multiplicand, can have three decimal digits, and the factor C, which is the addend or subtrahend, can have three decimal digits. Fig. 2 shows in tabular form a generalized solution of the problem where the multiplier A is the two digit number ST, the multiplicand B is the three digit number PQR, and the addend C is the three digit number KLM. The significance of the alphabetic symbols shown in the generalized solution will be clear if they be compared with their counterparts in the specific solution shown where A is 87, B is 617, and C is 438.

The method of solution illustrated, while differing from the conventional arithmetic method, produces the same result and may be more conveniently "mechanized" in the present embodiment than the conventional method.

Observe that a denominational total may be derived for each denominational order by combining the partial product digits and the C digit in that order. For example in the specific solution shown, the tens denominational total of 20 is derived by combining the digits 4, 7, 6 and 3 all of which contribute to the total in that denomination. Note too that the denominational total for any order, when augmented by carry digits from lower orders provides a number whose units digit is the result digit for the denomination in question and whose tens digit is the amount to be carried to the next higher order. For example in the specific solution shown, the tens denominational total 20, when augmented by the carry digit 1 from the units denominational total provides the number 21 whose units digit 1 is the result digit for the tens denomination and whose tens digit 2 is the amount to be carried by the hundreds denomination.

While in the solution shown, the term C has been added to the product $A \times B$, it is clear that if it were to be subtracted, the denominational totals would be derived by subtracting the C digits from the sums of corresponding partial product digits; the derivation of result digits from the denominational total thus obtained would be the same as was described above.

Note, however, that a C digit may exceed the sum of the corresponding partial product digits from which it is to be subtracted; in this case the denominational total, which is actually a negative number 0–9, may be represented by a tens digit of $-1$ and a positive units digit. Such a representation is the equivalent of "borrowing" in conventional subtraction.

Establishing partial product analogues

Neglecting for the moment the means by which the C term is added or subtracted, carries effected, and the final result digits displayed, all of which will be described in detail in the following sections, consider now the means by which physical analogues of the partial product digits are set up in response to the factor entry means and combined additively within each denominational order. As stated earlier, the physical analogues used in the illustrative embodiment are electrical resistances. One unit of resistance is used to represent one digital unit; thus the number of units of resistance established for a given partial digit will represent the value of the digit.

Figure 3:
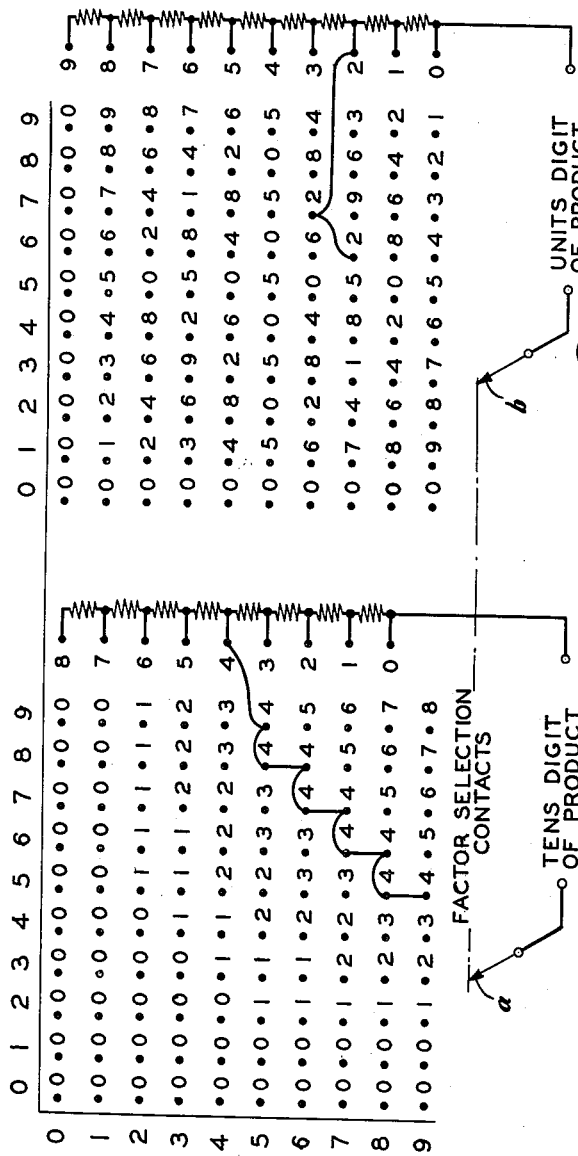
Fig. 3 shows schematically the function table used to derive partial product analogues.

The basic element used to form the partial product digit analogues is the function table shown schematically in Fig. 3. The right section of the function table shown establishes a resistance proportional to the units digit of the partial product while the left section establishes a resistance proportional to the tens digit. Entry of factors to the table is accomplished by connecting the contacts $a$ and $b$ to appropriate contacts in the table. For example, to multiply $6 \times 7$ the contacts $a$ and $b$ are connected to the table contacts in the horizontal row marked 6 and the vertical columns marked 7 or vice versa. In either case contact $a$ will be connected to a contact designated 4 and contact $b$ will be connected to a contact designated 2. Each of the numbered contacts in the left and right sections of the table is connected to the similarly numbered terminal of the associated series of resistors; thus values of resistance proportional to the values of the partial product digits appear across the output terminals of the table when contacts $a$ and $b$ are positioned in accordance with the factors to be multiplied. Note that the resistance analogues of the two digits of the product appear independently and are thus available individually for interconnection with other product digit analogues in the same denominational order.

Figure 4:
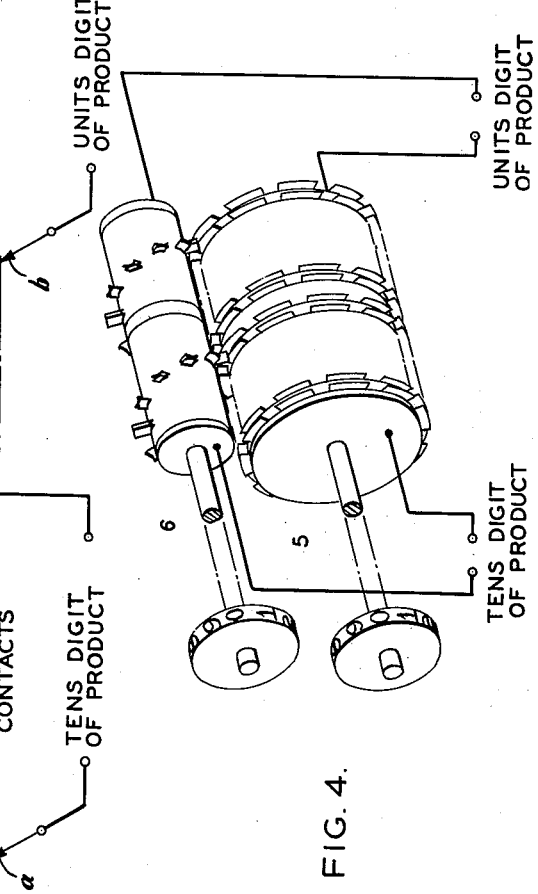
Fig. 4 shows the physical arrangement of a typical function table.

In the present embodiment, the function tables described above are constructed in the form of coacting rotatable drums as shown in Fig. 4. Drum 5 carries the 200 table contacts and contains the units and tens resistors interconnected with the contacts as shown in Fig. 3. Drum 6 carries a set of 20 helically disposed contacts, 10 of which are directly connected together and are the equivalent of the contact $a$ in Fig. 3, and the other 10 of which are directly connected together and are the equivalent of the contact $b$ in Fig. 3. Rotational positioning of drum 5 in effect selects one of the horizontal rows of Fig. 3 by presenting that row of contacts in position for tangential contact with the contacts of drum 6. Rotational positioning of drum 6 in effect selects the pair of similarly numbered vertical columns of Fig. 3 by presenting two of the helically disposed contacts in position for tangential contact with the row presented by drum 5.

Thus when drum 5 is positioned to present the row of contacts associated with one number and drum 6 is positioned to present the contacts associated with another number, the contacts so presented meet and the product of the two numbers is manifested by the units of resistance between each of the pairs of output terminals.

Figure 5:
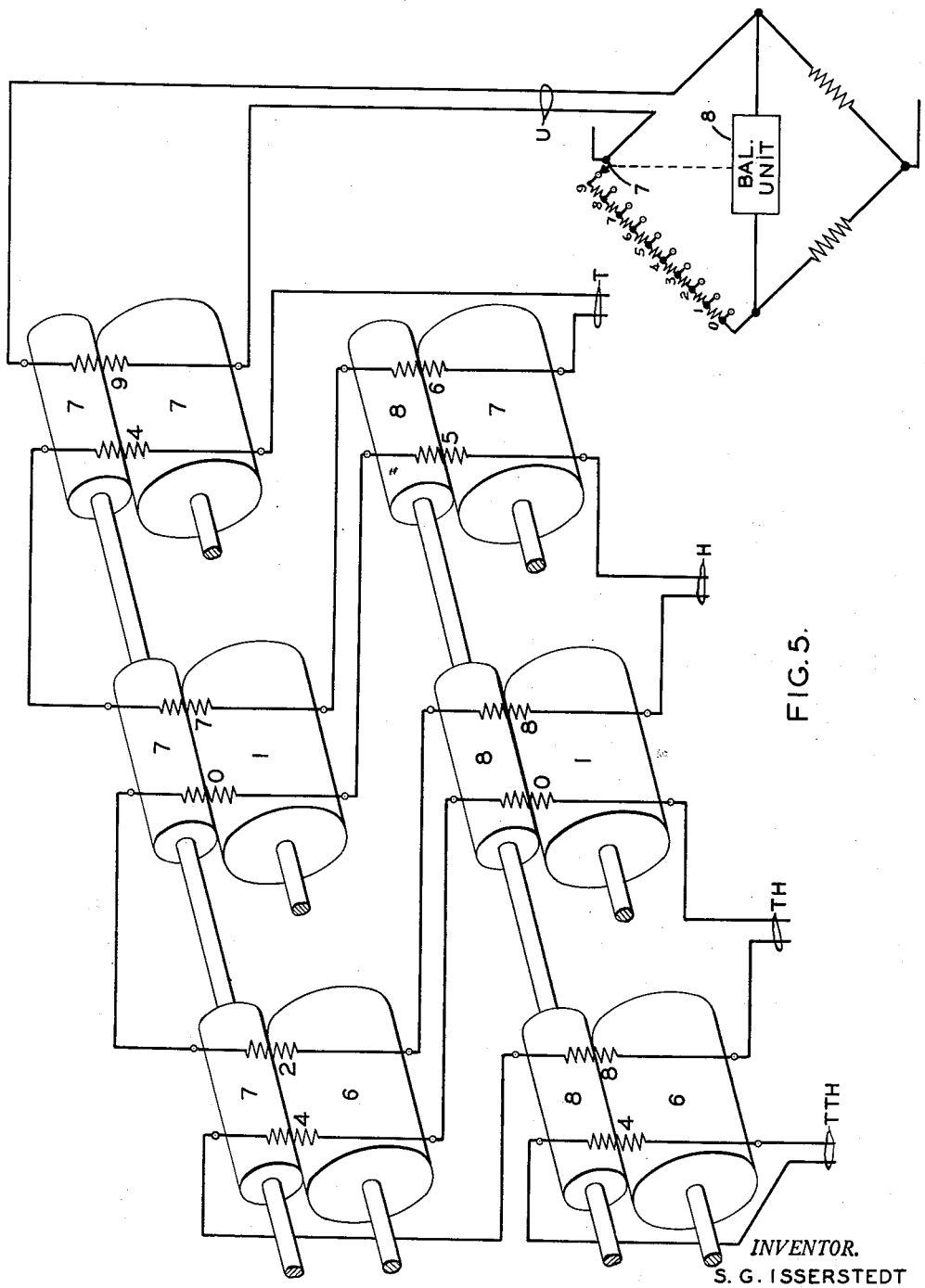
Fig. 5 shows the inter-denominational interconnections between function tables.

The product of each multiplier digit with each multiplicand digit is derived in the manner described above, there being six pairs of drums in the illustrative embodiment, one pair to derive the product of each of the two multiplier digits with each of the three multiplicand digits. Fig. 5 shows schematically the arrangement of the drums and the interconnections between drums. The drums are illustrated as being positioned to multiply 617 by 87 as in the example of Fig. 2. A number on each drum indicates the input digit the drum is positioned to represent. The multiplicand 617 is entered by positioning the drums shown in the second and fourth rows, and the multiplier 87 is entered by positioning the drums in the first and third rows. With the drums so positioned, the partial product resistances shown will be established between the two pairs of output terminals for each drum, the resistance between one pair of terminals representing the units digit of the partial product and that between the other pair representing the tens digit. The output terminals of the drums are interconnected as shown, in accordance with the solution of Fig. 2, to accomplish the summation for each denominational order of the result. The resistances thus established between each of the pairs of terminals marked U, T, H, TH, and TTH are proportional to the A×2 product totals for the respective denominations.

Neglecting for the moment the means for adding or subtracting the term C, which will be described later, recall that the resistances established for each denominational order of the result are connected in one leg of an associated self-balancing impedance bridge which controls a result digit display wheel and effects carries between denominational order as a result of its balancing action. A typical bridge is shown in a simplified schematic way in Fig. 5. There the resistance representing the units digit of the product A×B is connected in one leg of the bridge and balanced by positioning the balance switch 7 which is controlled by the balancing circuit 8. Any inequality between the digit resistance and balancing resistance causes a potential difference across the balancing circuit. This potential difference controls a switch driving mechanism which increases or decreases the balancing resistance to match the digit resistance. When balance is achieved both terminals of the balancing circuit are at the same potential and the mechanism that drives the balancing resistance switch is inactivated.

In the simplified bridge of Fig. 5 the variable balancing resistance need have a range of only 9 units since the units denominational total of the product A times B with which it is associated can only have the values 0–9. Note, however, that other denominational totals, for example, the tens, hundreds and thousands totals may exceed 9; consequently provision must be made for balancing larger resistances and carrying between orders in the bridges associated with those orders.

*Addition or subtraction of the term C*

Before proceeding to a description of the other denominational orders and the means for carrying between orders, consider first the means employed to add or subtract the term C from the product A times Z, since these means also influence the configuration of each bridge. Broadly stated the method is to set up quantized resistances proportional to each digit of the term C (K, L, and M generally or 438 in the specific example of Fig. 2) and to introduce these resistances into the bridges corresponding to the denominational orders to which they are to be added or subtracted. If the term C is to be added, then the resistances proportional to its digits are connected in the same bridge legs as the partial product resistances for the same denominational order. The balancing resistances in this case must balance the same of the partial product and addend resistances. If the term C is to be subtracted, then the resistances proportional to its digits are connected in the bridge legs containing the balancing resistances. In this case the balancing resistances must balance merely the difference between the partial product resistance and the subtrahend resistance rather than their sum as in the case of addition.

It is apparent that the sample bridge circuit shown in Fig. 5 is inadequate to perform the addition and subtraction functions; a suitable modification of the simple circuit is shown in the right portion of Fig. 6. Here the resistance analogue of the partial product denominational total is introduced at terminals 9, and the resistance analogue of the corresponding digit of the term C is introduced by means of the switch 10.

If the term C is to be added to the product of A and B, the switch 11 is thrown to the left so that the C digit resistance is in the same bridge leg as the partial product resistance. If the term C is to be subtracted from the product of A and B, the switch 11 is thrown to the right so that the C digit resistance is in the bridge leg containing the balancing resistance. The switch effectively changes the bridge junction from one side of the C digit resistance to the other and thereby selectively inserts the resistance in one bridge leg or the other to accomplish either addition or subtraction of the C term. The balancing resistance shown can be varied by means of switch 12 in increments of one unit between a maximum of 18 units more than and a minimum of 9 units less than the zero reading value of 9 units. The maximum provides adequate range of variability for effecting balance when a C digit of 9 is added to (connected in the same leg as) a partial product total of 9, while the minimum provides adequate range of variability for effecting balance when a C digit of 9 is subtracted from (by connection in the balancing leg) a partial product total of 0. These are the extreme limits for which the bridge associated with the units digit of the result may be required to balance. The zero reading value of the balancing resistance (9 units) is balanced by the resistance 13 of equal value.

The required range of variability required in the balancing resistances in the other denominational orders may be similarly determined; however, this consideration will be deferred until the transfer (carry or borrow) means have been described since the transfer means in each order affect the required balancing resistance range in the next higher order.

*Summary of means for establishing and measuring denominational analogues*

Before proceeding to a description of the transfer and result display means, it is well to summarize the description and explanation thus far, in which it has been shown how quantized analogues are established for each denominational order and briefly how such denominational analogues are measured.

Summarizing the description, thus far:

(1) The factors A and B of the equation $$(A \times B) + C = X$$

are entered by manually rotating drum type function tables; this establishes a resistance proportional to each digit of each partial product comprising the total product $A \times B$.

(2) By means of interconnections between drums, the individual partial product digit resistances in a given denominational order are connected in series in one leg of a self-balancing impedance bridge; a bridge is provided for each denominational order.

(3) The term C is entered manually by means of an incrementally variable resistance associated with each of its digits. Each C digit resistance is connected in one leg or the other of the associated bridge depending upon whether it is to be added or subtracted.

(4) A variable balancing resistance in each bridge is adjusted under the control of a balancing circuit to maintain equality between the resistances in the two legs of the bridge. The balancing resistance in each bridge must have a range of variability adequate to permit balancing the maximum partial product and C digit resistance when all are connected in the one leg and also to permit balancing when the maximum C digit resistance is connected in the balancing leg with nothing in the other leg.

*Inter-denominational transfer and result display*

Consider now the means for effecting transfer (carry or borrow) between denominational orders and for displaying result digits. The balancing resistance arrangement shown in Fig. 6 between points F and G and described previously would perform the balancing function adequately and its position after balance would accurately indicate the denominational total; however, a more convenient arrangement of the balancing resistance for accomplishing carry and display is shown between points F' and G'. There the total balancing resistance is divided into two sections each incrementally variable by means of an associated rotary switch. Mechanical connection between the two rotary switches 14 and 15 is such that switch 15 advances one step clockwise as switch 14 advances clockwise from its 9 to its 0 position or moves one step counterclockwise as switch 14 moves counterclockwise from its 0 to its 9 position. Thus the total balancing resistance between points F' and G' can be increased by increments of one to a maximum of 19 units more than or a minimum of 10 units less than the zero reading value of 10 units.

This arrangement provides a slightly greater range of variability than is necessary (18 and −9 required; 19 and −10 afforded) but is otherwise the functional equivalent of the arrangement between points F and G and has the important advantage of presenting two separate analogues one of which is proportional to the units digit of the denominational total and the other of which is proportional to the tens or "carry-borrow" digit of the denominational total. By thus arranging the balancing resistances decimally, the displacement of switch 14 provides a physical analogue of the result digit in that denomination and the displacement of switch 15 provides a physical analogue of the transfer digit or amount to be carried to or borrowed from the next higher order.

As shown in Fig. 6, a number display wheel 16 is mechanically connected to rotary switch 14, to display the denominational result digit and rotary switch 15 is mechanically coupled with another rotary switch 17 which increases or reduces resistances in the next higher bridge to effect transfer.

The transfer resistance may be connected in either leg of the next higher bridge; the only functional requirement to be met is that a carry condition cause a one unit increase in the next higher balancing resistance and that a borrow condition cause a one unit decrease. The most straight-forward approach would be to use switch 17' connected in the right leg of the next higher bridge so that a carry condition would increase and a borrow condition would decrease by one unit the resistance presented by switch 17' and thus cause the balancing resistance to be increased or decreased by the same amount. The alternative approach which is used in the illustrative apparatus is to connect the transfer switch 17 in the balancing leg of the next bridge so that a carry condition decreases and a borrow condition increases by one unit the resistance presented by switch 17. This produces the same change in balancing resistances as the other approach without increasing the upper range of resistance that may occur in the right hand bridge leg, thus minimizing the disparity that may occur between upper and lower leg resistance and thereby improving bridge performance.

Note that while each step of the tens balancing resistance switch 15 must equal ten units, each step of the transfer resistance switch 17 with which it is mechanically coupled must equal only one unit.

Note also that the transfer resistance in any order must have a range adequate to manifest as many carry digits as may be generated in the next lower order; practically this requires that the transfer resistance switch in any order have as many contact positions as the tens balancing resistance switch of the next lower order (with which it is mechanically coupled).

*Circuit arrangement in illustrative apparatus*

Complete circuits for the illustrative apparatus are shown in Figs. 7a to 7c taken together in the manner of Fig. 7d. Most of the functional elements shown there have been individually described and explained in the foregoing; it is necessary here only to summarize their functions and interrelation.

As has been previously explained, resistance analogues of each product denominational total ($P_u$, $P_t$, $P_h$, $P_{th}$ and $P_{tth}$) are established by the interconnected function table 18 and are connected in the right-hand legs of associated bridges. In the three lowest denominational orders resistance analogues of the digits of the term C are connected either in the right legs of the associated bridges if the C term is to be added or in the left leg if it is to be subtracted. Tens and units balancing resistances (T and U) are switched under the control of associated balance control units to establish balance between the total right leg and left leg resistance in each bridge. Transfer resistances (TR) in the left leg of each bridge (except the first) are also switched under balance unit control in accordance with the effective value of the tens balancing resistance (T) of the next lower bridge. A carry condition (increased T resistance) in one order is accompanied by a decrease in the transfer resistance connected in the left leg of the next higher order and therefore causes the balancing resistance in the next higher order to be increased. A borrow condition (decreased T resistance) in one order is accompanied by an increase in the transfer resistance in the next higher order and therefore causes the balancing resistance in the next higher order to be decreased.

Number display wheels D mechanically coupled with the units balancing resistance switches U of each order serve to display the digital results.

Having thus summarized the interrelation between the various function tables and bridges, some details of bridge configuration not heretofore discussed should be considered before proceeding to a description of the balance control units.

Consider first the requisite range of variability of the balancing resistances in the various orders. In any order, the balancing resistance must be capable of effecting balance in the extreme condition when the sum of the product denominational total, the C digit to be added, and the transfer from the next lower order is maximum. The fact that this maximum varies from order to order accounts for the differences in ranges of balancing resistances in the various orders. For example in the bridge associated with the hundreds denomination the requirement for maximum balancing resistance occurs when the product total is 30, the transfer from the tens order is 2 and a C digit of 9 is added. In this extreme case, the effective resistance of the T and U balancing resistances for the hundreds denominational order must be increased by 41 units (30+2+9).

It should be noted that the above product total 30 is the maximum that can occur in the hundreds denomination for any combination of multiplier and multiplicand digits. The above transfer, 2, from the tens order is not the maximum that may occur from that order, but it is the maximum that may occur when the multiplier and multiplicand digits are such as to give the maximum product total 30 in the hundreds denomination. Any combination of multiplier and multiplicand digits that would give rise to the maximum transfer of 3 from the tens order would limit the hundreds product total to a value less than 30; thus the maximum balancing resistance in the hundreds order is governed by the values 30 plus 2 (plus the maximum C digit values of 9).

The maximum balancing resistance required in each of the other orders may be similarly determined. The maximum combinatiton for any given order of product total and transfer from the next lower order may be readily determined by inspection and trial. The following table is a summary of such a determination for each of the orders.

|  | TTH | TH | H | T | U |
| --- | --- | --- | --- | --- | --- |
| Max. Combined Prod. Total and Transfer From Lower Order | 9 (8+1) or (7+2) | 24 (21+3) | 32 (30+2) | 27 (26+1) | 9 (9+0) |
| Max. C Digit | 0 | 0 | 9 | 9 | 9 |
| Max. Bal. Range Reqd. Above Zero Reading Value | 9 | 24 | 41 | 36 | 18 |

The lower limit for each order, i.e., the maximum amount by which the effective balancing resistance must ever be reduced below the zero reading value may be similarly determined. This lower limit situation occurs when in a given order the maximum C digit resistance, if any, and the maximum transfer resistance are simultaneously inserted in the balancing leg while the product resistance in the other leg is zero. In this situation the balancing resistance must be reduced from its zero reading value by an amount equal to the C digit and transfer resistance added. For example in the hundreds order, if the product total were zero, a nine digit were to be subtracted and the transfer resistance were increased by a borrow from the tens order, the balancing resistance would have to be reduced by 10 units from its zero reading value to compensate for the 9 unit C digit resistance and the 1 unit transfer resistance inserted in the balancing leg.

The following table shows the lower limits and their derivation for all orders:

|  | TTH | TH | H | T | U |
| --- | --- | --- | --- | --- | --- |
| Max.—C Digit | 0 | 0 | 9 | 9 | 9 |
| Max.—Transfer From Lower Order | 1 | 1 | 1 | 1 | 0 |
| Bal. Range Reqd. Below Zero Reading Value | 1 | 1 | 10 | 10 | 9 |

Note that due to the decimal arrangement of tens and units balancing resistances, the actual ranges provided are in most cases somewhat more than are actually required; for example, the upper limit provided for the hundreds order is 49 whereas only 41 is required. In each case the range provided is the lowest tens multiple that embraces the required range.

In connection with the bridge for the ten thousands denomination note from the first table above that no carry can ever be generated from that order $$(99 \times 999 + 999 = 99900)$$

Note, however, from the second table above that a borrow may be generated in that order; this situation will occur whenever the C term is subtracted from a product smaller than the C term. Since the illustrative apparatus is not arranged to display negative results, an indicator circuit 19 associated with the T switch in the TTH order is provided to signal this condition.

The effective zero reading value of resistance in the left bridge leg must be balanced by an equal fixed resistance in the right leg. The value of this resistance for any order is seen to be the sum of the effective zero reading resistance of the tens balancing resistance and the transfer resistance. These values are summarized in the following table:

|  | TTH | TH | H | T | U |
| --- | --- | --- | --- | --- | --- |
| Tens Balancing | 0 | 10 | 10 | 10 | 10 |
| Transfer | 2 | 4 | 3 | 1 | 0 |
| Total Zero Reading Resistance Units in Left Bridge Leg | 2 | 14 | 13 | 11 | 10 |

Fixed resistances 20 proportional to the above values are provided in the right leg of each bridge; since in the illustrative apparatus one unit is equal to ten ohms, the actual resistance values shown in ohms are 10 times the numbers of units indicated in the table above.

A small variable resistance 21 is provided for each bridge in the same leg as the balancing resistance for adjustably increasing the zero reading value of left leg resistance to exactly equal that of the right leg. Left leg resistors may be chosen accordingly such that none measures more than its nominal values.

Values of the resistances 22 in the lower bridge legs are chosen to equal the average value that the upper leg resistances will assume in operation since bridge sensitivity is greatest when upper and lower leg resistances are equal. This value for any bridge is determined by halving the sum of the minimum and maximum resistances that may occur in either of the upper legs.

In connection with bridge sensitivity it should be noted that the resistance range in the upper legs may be reduced and the bridge sensitivity thereby improved by employing the principle that subtracting the complement of a number from a given order and adding 1 to the next higher order is the equivalent of adding the number to the given order. For example the equivalent of adding, say, 6 to the hundreds order is to subtract 4 (its complement) from that order and add 1 to the next higher order. By wiring a portion of the partial product digits contributing to a denominational total to add into the right bridge leg and the complements of the rest to subtract from the left bridge leg and wiring a fixed one to add into the next higher order for each of the digits subtracted, the same result is achieved but the range of variability of balanced upper leg resistance is reduced and bridge sensitivity at the extremes of the range is correspondingly increased. Note that to employ this means, the partial product function tables for digits to be wired into the left bridge legs to subtract must be modified to derive complementary values.

An alternating potential is applied across each bridge through an associated transformer 23; the potential thus applied is adjustable by means of variable resistances 24. The transformers 23 are supplied over lines 24' through switch 25 from a suitable source of alternating potential.

If a bridge is balanced, no potential will appear across its associated resistance 26; if the bridge is unbalanced, an alternating potential proportional to the degree of unbalance will appear across its associated resistance 26. The sense of the unbalance, i.e., whether the right or left leg resistance is larger, will be manifested by the phase relationship between the impressed potential and the potential developed across resistance 26. If the resistance in the right bridge leg is larger, then the alternating potential developed on line 27 with respect to ground will be in phase with the potential impressed at point 28 with respect to ground; if the resistance in the left leg is larger, the opposite phase relation will obtain.

Balance control circuits

The signals produced across resistors 26 as a result of unbalance in the various bridges are applied over lines 27 to the respective balance control units. The balance control unit for the TTH denomination is shown schematically in Fig. 7c; the units associated with other orders are identical.

In the balance control units, unbalance signals are converted to the mechanical displacements necessary to effect balance resistance switching and restore balance. The basic mechanical displacement produced by the balance control unit (Fig. 7c) is an angular displacement of wheel 28 in one direction or the other depending upon the sense of unbalance detected. The mechanical coupling between wheel 28 and the rotary switches and display wheel in that denominational order are represented by broken line 29. The functional requirements of the couplings have been described in the foregoing; their physical arrangement will be described in a following section. For the present purpose of describing the circuits of the balance control unit it is necessary only to state that the wheel 28 will be driven in one direction when actuator coil 30 is energized, in the other direction when actuator coil 31 is energized and not driven at all when neither coil is energized.

The actuator coils are energized through contacts 32 and 33 of a self-centering, polarized relay. When no current flows in coil 34 both contacts 32 and 33 are open. Current flowing through coil 34 closes contact 32 or 33 depending upon the direction of current flow. Observe that due to the symmetry of the circuit, no current will flow in coil 34 as long as triode 35 conducts equally with triode 36. Equal conduction will occur when the grid of triode 35 is at ground potential since the grid of triode 36 is fixed at ground potential. Raising or lowering the potential on the grid of triode 35 will destroy symmetry, cause triode 35 to conduct more or less than triode 36 and consequently close contact 32 or 33.

The signal used to control the grid potential of triode 35 is an amplified unbalance signal from the associated bridge. Recall that an alternating potential is impressed across the bridge (Fig. 7a). If the resistance in the left leg is too small the alternating potential developed on conductor 27 will be in phase with the potential impressed at point 28; if the resistance in the left leg is too large the potentials will be of opposite phase. If the right and left leg resistances are equal, conductor 27 will remain at ground potential.

Whatever signal is developed on conductor 27 is amplified by triode 37 and applied to the grid of triode 35 through capacitor 38. Anode potential for the amplifier triode 37 is provided by triode 39 which is connected to operate as a half wave rectifier. A filter network in its cathode circuit smooths the rectified output on line 40 to provide a substantially steady potential to the anode of the amplifier triode 37.

Observe that the amplified signal applied to the grid of triode 35 will be either in or out of phase with the alternating potential from transformer 41 applied to the anodes of triodes 35 and 36 depending upon the sense of the unbalance in the bridge. An in-phase signal will increase the conduction in triode 35 while an out-of-phase signal will decrease it. Coil 34 will accordingly close contact 32 or contact 33 depending upon the phase of the incoming signal and consequently cause the wheel 28 to be driven in one direction or the other depending upon the sense of unbalance in the associated bridge.

Capacitors 42 and 43 limit the rate of change of potential across resistors 44 and 45 and thereby smooth the potential applied across coil 34.

Energizing potential for actuator coils 30 and 31 is supplied from the main power line through switch 46 and relay contact 47. Contact 47 closes when coil 48 is energized by the depression of switch 49 and opens when the coil is de-energized by the depression of switch 50. A holding contact 51 keeps coil 48 energized through switch 50 when switch 49 is released.

The motor 52 drives the counter rotating shafts 53 and 54 and is energized from the main supply line through switch 46.

Mechanical arrangement of illustrative apparatus

The foregoing has described the mode of operation of the illustrative apparatus and the functional interrelation between its various components. It remains now to describe the mechanical arrangement of the apparatus which is shown in the general view of Fig. 1.

First consider the means by which the partial product function table drums are positioned by the factor entry wheels associated with the multiplier and multiplicand. Referring to Fig. 8, which is a top view of the apparatus, the multiplier A is entered by means of entry wheels 101 and 102 and the multiplicand B is entered by means of entry wheels 103, 104, and 105.

The mechanical couplings between the wheels and the drums they control are shown in Figs. 8 through 11 as follows:

Wheel 101 positions drum 106, 107, and 108 through gears 109, 110, 111, 112, shaft 113, gears 114, 115, 116, 117, and shaft 118. Number wheel 119 attached to gear 111 displays the digit entered and detent wheel 120 attached to gear 115 is engaged by detent 121 to provide 10 stable stopping positions for the gear train and drums. Gear ratios are such that for each of the 10 drum positions, an associated number is displayed by number wheel 119.

In a similar manner, wheel 102 positions drums 122, 123, and 124 through gears 125, 126, 127, 128, shaft 129, gears 130, 131, shaft 132, gears 133, 134 and shaft 135. Number wheel 136 attached to gear 127 displays the digit entered and detent wheel 137 attached to gear 128 provides 10 stable stopping positions for this gear train and the associated drums.

Wheel 103 positions drums 138 and 139 through gears 140, 141, 142, shaft 143, gears 144, 145, shaft 146, gears 147, 148, shaft 149, gears 150, 151, 152, and 153. Gear 141 also drives gear 154 to which number wheel 155 is attached and gear 154 drives gear 156 to which detent wheel 157 is attached.

Wheel 104 positions drums 158 and 159 through gears 160, 161, 162, shaft 163, gears 164, 165, 166, 167, shaft 168, gears 169, 170, shaft 171, gears 172, 173, and 174. Gear 161 also drives associated number wheel 175 and detent wheel 176 through gear 177 in the same manner as described above in connection with wheel 103.

Wheel 105 positions drums 178 and 179 through gears 180, 181, 182, shaft 183, gears 184, 185, 186, shaft 187, gears 188, 189 and 190. Gear 181 also drives associated number wheel 191 and detent wheel 192 through gear 193 in the same manner as described above in connection with wheel 103.

A stop 194 affixed to gear 181 and similar stops on corresponding gears of the other entry trains prevents the associated drums from being rotated more than one revolution and thus prevents wire connections to the drums from being broken.

Thus it is seen that each of the function table drums is rotated to one of ten positions in accordance with the value of the multiplier or multiplicand digit entered on the associated entry wheel. The method by which resistance analogues of the partial product digits are formed and combined by denominations has been previously explained.

The digits of the term C to be added to or subtracted from the product $A \times B$, are entered by means of wheels 195, 196, and 197. Wheel 197 positions contact 198 of a ten position rotary switch through gears 199, 200, and 201. Gear 200 also drives number wheel 202 and detent wheel 203 through gears 204 and 205. The arrangement associated with wheels 195 and 196 is identical.

Wheel 206 through cam 207 selectively opens switch contacts 208 or 209 to insert the C digit resistances in one leg or the other of associated bridges and thereby cause the C term to be added or substracted. Wheel 206 also positions display strip 214 through gears 210, 211, arm 212, and rod 213, to show whether the C term is being added or subtracted.

The foregoing has described the mechanical arrangement of the means for entering input data. Consider now the mechanical arrangement of the means for switching balancing resistances and display results.

Referring to Fig. 13, motor 215 drives shafts 216 and 217 in opposite directions through belt 218 to provide driving power for the mechanism associated with each of the five denominational orders of the result. The mechanism associated with a typical order will be described; the mechanism for other orders is identical.

Power from the shafts 216 and 217 is transmitted to the mechanism for each order through a clutch wheel 219 which is mounted on an arm 220 mounted pivotally above a shaft 221. The position of the arm 220 is controlled by actuator coils 222 and 223 through armatures 224 and 225 and connecting members 226 and 227. When neither coil is energized, springs 228 and 229 constrain the movable assembly in a mid-position and clutch wheel 219 engages neither of shafts 216 and 217. Energizing coil 222 or 223 (under the control of an associated balance control circuit as previously explanied) will cause clutch wheel 219 to selectively engage either shaft 217 or 216, and be driven in one direction or the other. Clutch wheel 219 ultimately drives rotary switch contacts 230, 231, and 232 and an associated number display wheel 233. Contacts 230 and 231 are respective'y the contacts for switching the units and tens balancing resistances in the bridge for the denominational order associated with clutch wheel 219 and contact 232 is the contact for switching the transfer resistance in the next higher order. The function and electrical arrangement of these switches has been previously explained in connection with the schematic diagram of Figs. 7a to 7c. Recall that the units resistance contact 230 and the number wheel 233 must be driven together in increments of one-tenth revolution and that for every complete revolution of contact 230, the tens and transfer resistance contacts 231 and 232 must be advanced by an increment of one-tenth revolution. The mechanical coupling by means of which this is achieved is as follows: Clutch wheel 219 carries gear 234 which, through gear 235, drives gear 236. Gear 236 carries a pin 237 that engages geneva 238 each revolution. The geneva 238 carries gear 239 that drives number wheel 233 through gears 240, 241 and 242, and also drives contact 230 through gear 243. The gear ratios are such that for each actuation of the geneva 238, both the number wheel 233 and contact 230 are advanced one-tenth of a revolution. At every tenth actuation of the geneva, intermittent teeth 244 attached to gear 240 engage gear 245 and drive contacts 231 and 232 one-tenth of a revolution through gears 246, 247 and 248.

Summarizing the foregoing description of the mechanical action, the number wheel 233 and units resistance contact 230 are driven in one-tenth revolution quantized increments each time the geneva 238 (which performs the quantizing function) is actuated. Also the tens and transfer resistance contacts 231 and 232 are driven in one-tenth revolution quantized increments at every tenth actuation of the geneva. The direction the contacts and number wheel are driven depends upon which of the drive shafts 216 or 217 the clutch wheel 219 is actuated to engage. The mechanical relationships are the same in either direction.

Recall that once unbalance has been created by the entry of factors, member 227 will be displaced and the driving action will continue until the rotary contacts 230 and 231 have re-established balance. The number of geneva actuations required to effect balance will rotate the number wheel to display the denominational result digit and will also position rotary contact 231 to establish the proper carry or borrow resistance in the next higher order.

Note that after balance is achieved, there is inevitably some time lag before the balancing circuit can disengage the clutch. The use of the geneva, however, renders such a lag tolerable since gear 236 may be driven for practically a full revolution after the geneva actuation that effects balance without disturbing the balance. As long as, after balance, the clutch wheel 219 is out of contact with the drive shaft 216 or 217 before pin 237 engages the geneva again, balance will not be disturbed since the inertia of wheel 219 and gears 234, 235 and 236 may be made so low as to be insufficient to actuate the geneva when rotating free of the drive shafts.

The lower gear train and actuators (similarly numbered) in Fig. 13 are the drive mechanism for another denominational order. The drives for the U, T, and TTH denominations are all identical with the upper mechanism and the drives for the H and TH denominations are identical with the lower mechanism. This staggered arrangement is used because the width of each drive mechanism is greater than the width of its associated number wheel.

Decimal point location

The method used to handle decimal points in the illustrative apparatus is shown diagrammatically in Fig. 14. The multiplier decimal point is entered by means of entry wheel 249 which is mechanically coupled with belt 251 carrying the multiplier decimal point display. Similarly, the multiplicand decimal point is entered by means of entry wheel 250 coupled with be't 252 that carries the multiplicand decimal point display. A differential 253 coupled with both entry wheels combines the two motions vectorially and controls belt 254 to display the result decimal point location and the requisite decimal point position in the C factor to be added or subtracted. The differential is arranged so that displacement of either belt 251 or belt 252 a given number of places in either direction from the reference positions shown causes an equal displacement of belt 254. If belt 251 is displaced in one direction the same number of places as belt 252 is displaced in the other direction, no net displacement of belt 254 occurs. If belts 251 and 252 are displaced in the same direction, then belt 254 is displaced by an amount equal to the sum of the two displacements.

Detent wheels 255 coupled with the input shafts insure that the decimal points displayed are correctly positioned between number wheels.

Fig. 15 shows a display arrangement that may be used, in which fixed zero displays 256 are mounted adjacent the most and least significant variable digit dials associated with each of the input factors and the result. The purpose of these fixed zero displays is to extend the useful range of the decimal point display means and thereby permit calculations involving a wider range of absolute values. For example, without the fixed zero display adjacent dial 155, the maximum multiplicand that could be clearly displayed would be 999; however, the addition of the fixed zero display adjacent dial 155 permits the display of a multiplicand as large as 9990. Similarly the addition of the fixed zero display adjacent dial 191 permits the display of multiplicands as small as .0001 rather than .001 as would otherwise be the case. The fixed zero displays adjacent both the multiplier dials 136 and 119 serve similarly to extend the useful range of multipliers that may be handled.

Sufficient zero displays are mounted to the right and left of C factor dials 202 and result dials 233, to provide for all combinations of decimal point location within the multiplier and multiplicand.

Thus it is seen that in addition to the example described earlier (87×617+438=54,117), the following calculations, for example, may be handled:

.0870×.06170+.000043800=.005411700
0870.×06170.+000043800.=005411700.
08.70×0.6170+0000.43800=005.411700

It is clear in view of the foregoing that factors within an even greater range of absolute values may be handled if additional fixed zero indicators are provided.

It should be noted that while, for simplicity, bridges and associated circuits in the earlier portions of the description have been referred to as being associated with particular denominational orders (e.g. "the bridge associated with the hundreds denomination"), such reference is valid only when the result decimal point location follows the right-most dial 233. It is now clear that the denomination of the result digit handled by each bridge depends upon the result decimal point location. For example, the bridge associated with the right-most dial 233, previously referred to as the bridge associated with the units denomination, may actually handle anything from the hundreds denomination to the ten-millionths denomination depending upon the location of the result decimal point.

Other embodiments of the invention

The foregoing has described in detail an illustrative embodiment of the invention; the invention may, however, be practiced in a number of other ways some of which are described below.

While the illustrative embodiment is arranged to solve the equation A times B plus or minus C equals X, a wide variety of other equations may be solved by suitable arrangements of the same kinds of elements as those used in the illustrative embodiment. For example, the result X above may be fed to a similar unit as one of the input factors in another calculation. Or the function table connections may be arranged to derive exponential powers of numbers rather than products, so as to permit the solution of equations involving exponentials. Additional terms may be added or subtracted from the product by providing other entry means like those used to enter the C term.

The capacity of the illustrative embodiment may be readily increased to handle factors having more digits. A machine has been built that will handle 4 digit multipliers and 5 digit multiplicands. Embodiments having any desired capacity may be constructed in accordance with the same principles.

In some applications another form of input device may be preferable to the manually rotatable wheels shown in the illustrative embodiment. For example, a keyboard may be used, or a card sensing device. In other applications quantized shaft rotations, electrical quantities or other physical magnitudes may be used as inputs. Quantized inputs are necessary if the digital results are to have significance and validity.

Just as other input means may be used, so may other physical quantities than electrical resistance be used internally to represent partial product digits and addend or subtrahend digits. For example, these digits may be represented by means of other electrical quantities such as capacitance or inductance or by mechanical magnitudes such as linear or angular displacements. These can all be quantized, combined additively or subtractively and measured in ways analogous to those employed in the illustrative embodiment.

The electro-mechanical balancing means of the apparatus described may be replaced by other measuring and display apparatus depending upon the manner in which it is desired to display or utilize results. For example, in an embodiment using mechanical magnitudes to represent partial product and addend or subtrahend digits, the totalizing and display means may be entirely mechanical. On the other hand, where electrical quantities are used to represent the digits, totalizing may be done electrically without mechanical motion. In this case the result may be displayed for example on a cathode ray tube or it may not be displayed at all, but rather introduced as a voltage or as a pulse sequence to other apparatus.

The general convertibility between various kinds of physical magnitudes makes possible the embodiments suggested above as well as many others that will occur to those skilled in the art.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What is claimed is:

1. In a device for producing digital solutions of equations, means for entering the digital data of an equation, switching means for establishing electrical resistance analogues for each contributing digit in each denominational order, means for adding separately the resistance analogues corresponding to each denominational order, a self-balancing impedance bridge for each order, means for coupling the combined resistance analogues of each order with the bridge of that order, and means controlled by the self-balancing impedance bridges of each order for manifesting a denominational total for each order and effecting transfers between orders.

2. In a device for producing digital solutions of equations, means for entering the digital data of an equation, including a contact for each digit movable into any one of a plurality of positions, depending on the digit selected for entry, a function table cooperating with each contact, each table having a plurality of groups of terminals and a plurality of resistances of equal values connected in series, connections between each resistance of a table and associated terminals in groups predetermined depending on a computation to be performed, means for separately adding the resistances in each denominational order, a self-balancing impedance bridge for the contributing digit in each denominational order, means for coupling the combined resistance analogues for each order with the bridge of that order, and means controlled by the self-balancing impedance bridges for each order for manifesting a denominational total for each order and effecting transfers between orders.

3. In a device for producing digital solutions of equations, means for entering the digital data of an equation and producing partial functions thereof, switching means for establishing electrical resistance analogues for each contributing digit in each of the partial functions of the denominational order, means for adding the resistance analogues of each denominational order, a self-balancing impedance bridge for each order, having a first leg connected with the resistance analogues of the order, a series of resistances and a cooperating switch representing entry values in a second bridge leg, balancing means in a first diagonal of each bridge for operating the entry switch to balance the resistances entered in the first bridge leg, a second series of resistances and a cooperating switch representing transfer values in a bridge leg of a bridge of an adjacent order, means for operating the transfer switch of a first bridge and the transfer switch of an adjacent bridge by the entry switch of said first bridge, a source of alternating potential connected with the second diagonal of each of the bridges for operating the balancing means in the first diagonal, and means controlled by the self-balancing impedance bridge for each order for manifesting a denominational total for each order and effecting transfer between orders.

4. In a digital computing device, means for entering the digital data of an equation including a contact for each digit movable into any one of a plurality of positions depending on the digit selected for entry, function tables cooperating with said entering means, each table having a plurality of groups of terminals and a plurality of resistances of equal values connected in series, connections between each resistance of a table and associated terminals in groups predetermined according to the denominational order of the digits depending on the computation to be performed, a self-balancing impedance bridge for each digit having a first leg connected between one end of the series connected resistances and the cooperating contact of that digit, a series of resistances and a cooperating switch representing entry values in a second bridge leg, balancing means in a first diagonal of each bridge for operating the entry switch to balance the resistance entered in the first bridge leg, a second series of resistances and a cooperating switch representing transfer values in a bridge leg, means for operating the transfer switch controlled by the entry switch of one bridge and the transfer switch of an adjacent bridge, and a source of alternating potential connected with the second diagonals of all bridges for operating the balancing means in the first diagonal of each bridge.

5. In combination, means for registering a plurality of digital factors, means responsive to said registration means for establishing quantized electrical resistance analogues of partial functions of said digital factors, said resistance analogues being comprised of equal units of electrical resistance series connected, each resistance unit being the same for a digital unit of any denominational order, means for adding separately by denominations said resistance analogues of said partial functions to produce denominational totals for each order, means including a self-balancing impedance bridge for effecting carries between denominational totals to produce result digits, and means for manifesting said result digits.

6. In combination, means for registering a first and second digital factor, means operatively coupled with said registration means for establishing quantized electrical resistance analogues representative of partial products of said first and second factors, said resistance analogues being comprised of equal units of electrical resistance series connected, each resistance unit being the same for a digital unit of any denominational order, means responsive to said resistance analogues in accordance with each denominational order for manifesting denominational totals for each order, and means including a self-balancing impedance bridge responsive to said manifest denominational totals for effecting carries between denominational orders and manifesting the product of said first and second factors.

7. In combination, means for registering a plurality of digital factors, means responsive to said registering means for establishing quantized electrical impedances functionally related to said digital factors, means including a self-balancing impedance bridge for each denominational order for combining separately by denominations said quantized electrical impedances functionally related to said digits to produce denominational totals, and means operatively coupled with said self-balancing bridges for effecting carries between denominational totals.

8. Multiplying apparatus comprising means for registering a digital multiplier and multiplicand, means responsive to said registering means for manifesting quantized electrical impedances of the partial product digits of said multiplier and multiplicand, means including a self-balancing impedance bridge for each denominational order for combining separately by denominations said quantized electrical impedances of said partial products to produce denominational totals, and means operatively coupled with said self-balancing bridges for effecting carries between denominational totals.

9. In combination, means for registering first and second digital factors, means responsive to said registration means for establishing quantized electrical impedances of the digits of said factors, means including a self-balancing impedance bridge for each denominational order responsive to said quantized electrical impedances for selectively manifesting the sum of each denomination of said analogues to produce denominational totals, means for selectively connecting the impedance analogues to be combined in a leg of said self-balancing bridges, and means operatively coupled with said sum manifesting means for effecting carries between denominational totals.

10. In combination, means for registering a first and a second digital factor, means operatively coupled with said registration means for establishing physical quantities in the nature of quantized electrical impedances representative of partial products of said first and second factors, means responsive to said quantized electrical impedances in accordance with each denominational order for manifesting denominational totals, means responsive to said manifest denominational totals for effecting carries between denominational orders and manifesting the product of said first and second factors, said means for manifesting denominational totals comprising at least one self-balancing impedance bridge interconnected between said impedance and said means for effecting carries.

11. The combination according to claim 10 wherein the quantized electrical impedances representative of the partial products of said first and second factors comprise quantities representative of the individual digits of said partial products of said first and second digital factors.

12. In a device for producing digital solutions of equations, means for entering two groups of data of an equation, means for producing quantized physical analogues in the nature of quantized electrical impedances as partial products of entries of said two groups, means for entering a third group of data of said equation, means including a self-balancing impedance bridge for manifesting denominational totals of said partial products and said third group of data by combining separately by denominations said quantized physical analogues of said partial products and of said third group of data, and means operatively coupled with said self-balancing bridge for effecting carries between denominational totals.

13. In a computing device, means for registering two groups of variable digital entries, means responsive to said registering means for manifesting quantized electrical impedances of the partial product digits of said entries, means for entering a third group of digits, means including a self-balancing impedance bridge for manifesting denominational totals of said partial products and said third group of digits by adding separately by denominations said partial products and said third group of digits, means operatively coupled with said self-balancing bridge for effecting carries between said denominational totals and for manifesting result digits, and means for continuously varying the digits of a manifested result digit as a function of variation in the three groups of digits entered.

References Cited in the file of this patent

UNITED STATES PATENTS

| | | |
|---|---|---|
| Re. 22,486 | Starkey | May 23, 1944 |
| 1,515,995 | Bryce | Nov. 18, 1924 |
| 1,573,850 | Naiman | Feb. 23, 1926 |
| 1,838,647 | Watters et al. | Dec. 29, 1931 |
| 1,886,148 | Baumann et al. | Nov. 1, 1932 |
| 2,108,146 | Simpson | Feb. 15, 1938 |
| 2,123,142 | McMaster | July 5, 1938 |
| 2,172,078 | Zigueldе | Sept. 5, 1939 |
| 2,185,697 | Wood | Jan. 2, 1940 |
| 2,271,508 | Gordon | Jan. 27, 1942 |
| 2,329,180 | Boyd | Sept. 14, 1943 |
| 2,382,488 | Kenny | Aug. 14, 1945 |
| 2,394,429 | Crosman | Feb. 5, 1946 |

(Other references on following page)

UNITED STATES PATENTS

| | | |
|---|---|---|
| 2,427,463 | Avery | Sept. 16, 1947 |
| 2,431,906 | Arnason | Dec. 2, 1947 |
| 2,446,643 | Farmer | Aug. 10, 1948 |
| 2,511,924 | Lee | June 20, 1950 |
| 2,538,826 | Klemperer | Jan. 23, 1951 |
| 2,568,932 | Rajchman et al. | Sept. 25, 1951 |
| 2,584,897 | Marco | Feb. 5, 1952 |
| 2,594,043 | Liberman | Apr. 22, 1952 |
| 2,622,801 | Delfin | Dec. 23, 1952 |
| 2,630,552 | Johnson | Mar. 3, 1953 |
| 2,643,355 | Hallman | June 23, 1953 |
| 2,643,822 | Allen | June 30, 1953 |
| 2,673,030 | Isserstedt | Mar. 23, 1954 |
| 2,689,082 | Kolisch | Sept. 14, 1954 |
| 2,740,584 | Jocobi et al. | Apr. 3, 1956 |